United States Patent
Zhang et al.

(10) Patent No.: US 11,118,707 B2
(45) Date of Patent: Sep. 14, 2021

(54) FOUR-LAYER-STRUCTURE WATER PASSING DEVICE

(71) Applicants: Yangjiang New Sports Technology Products Co., Ltd., Yangjiang (CN); Shenzhen Kareeme Sports Products Manufacturing Co., Ltd., Shenzhen (CN)

(72) Inventors: Fan Zhang, Yangjiang (CN); Song Chen, Yangjiang (CN)

(73) Assignees: YANGJIANG NEW SPORTS TECHNOLOGY PRODUCTS CO., LTD., Yangjiang (CN); SHENZHEN KAREEME SPORTS PRODUCTS MANUFACTURING CO., LTD., Shenzhen (CN)

(*) Notice: Subject to any disclaimer, the term of this patent is extended or adjusted under 35 U.S.C. 154(b) by 144 days.

(21) Appl. No.: 16/249,212

(22) Filed: Jan. 16, 2019

(65) Prior Publication Data
US 2020/0072395 A1    Mar. 5, 2020

(30) Foreign Application Priority Data
Sep. 1, 2018   (CN) .......................... 201811017462.9

(51) Int. Cl.
| | |
|---|---|
| *F16L 11/00* | (2006.01) |
| *F16L 11/04* | (2006.01) |
| *F16L 11/11* | (2006.01) |
| *F16L 15/00* | (2006.01) |

(52) U.S. Cl.
CPC ............ *F16L 11/045* (2013.01); *F16L 11/11* (2013.01); *F16L 15/00* (2013.01)

(58) Field of Classification Search
CPC .......... F16L 11/045; F16L 11/11; F16L 15/00; F16L 11/115; F16L 21/007; F16L 21/05; F16L 39/02
USPC ................. 138/109, 121, 122, 114, 125, 126
See application file for complete search history.

(56) References Cited

U.S. PATENT DOCUMENTS

| | | | | |
|---|---|---|---|---|
| 656,187 | A * | 8/1900 | Gunnell | .................. F16L 47/24 285/148.13 |
| 1,044,013 | A * | 11/1912 | Burnett | .................. F16L 19/04 285/116 |

(Continued)

FOREIGN PATENT DOCUMENTS

| | | |
|---|---|---|
| CN | 104976466 A | 10/2015 |
| CN | 107524869 A | 12/2017 |

*Primary Examiner* — James F Hook
(74) *Attorney, Agent, or Firm* — Metis IP LLC

(57) ABSTRACT

A four-layer-structured water passing device is provided, in which a first sleeve and a second sleeve are disposed between an elastic inner tube and an outer cloth sheath. When the water passing device is connected with a pressurized water source, the first sleeve can quickly eliminate or reduce the impact wave strength when receiving a strong expansion impact from the elastic inner tube, such that the first sleeve can gently transmit the fluctuation to the second sleeve, and the second sleeve extends the outer cloth sheath to the limit length, so as to avoid damage caused by frequent direct contact friction between the elastic inner tube and the outer cloth sheath. The water passing device is also configured to avoid permanent deformation and abrasion at the joint position between the elastic inner tube and the outer cloth sheath, and thus prolong the service life of the water passing device.

8 Claims, 4 Drawing Sheets

(56) References Cited

U.S. PATENT DOCUMENTS

| | | | | |
|---|---|---|---|---|
| 2,102,010 A * | 12/1937 | Kopp | ................... | B29D 23/001 285/45 |
| 2,295,830 A * | 9/1942 | Carlson | ................... | F16L 35/00 285/115 |
| 3,980,325 A * | 9/1976 | Robertson | ............... | F16L 19/08 285/249 |
| 4,114,656 A * | 9/1978 | Kish | ................... | F16L 33/2071 138/109 |
| 4,349,049 A * | 9/1982 | Silvey | .................. | A01G 23/099 138/103 |
| 4,445,543 A * | 5/1984 | Mead | ................... | F16L 59/141 138/122 |
| 5,803,132 A * | 9/1998 | Lupke | .................... | B29C 48/21 138/141 |
| 6,334,466 B1 * | 1/2002 | Jani | ...................... | F16L 11/088 138/126 |
| 7,270,349 B2 * | 9/2007 | Bamberger | ........... | F16L 37/091 285/249 |
| 8,291,941 B1 * | 10/2012 | Berardi | .................. | F16L 11/20 138/118 |
| 8,479,776 B2 * | 7/2013 | Berardi | .................. | F16L 11/00 138/118 |
| 2002/0033196 A1 * | 3/2002 | Jeong | ...................... | B29C 53/50 138/123 |
| 2015/0007902 A1 * | 1/2015 | Ragner | ................. | F16L 11/118 138/121 |
| 2015/0308590 A1 * | 10/2015 | Liang | ................... | F16L 33/224 138/109 |

\* cited by examiner

FOUR-LAYER-STRUCTURE WATER PASSING DEVICE

CROSS-REFERENCE TO RELATED APPLICATION

This application claims priority to Chinese application number 201811017462.9, filed on Sep. 1, 2018. The above-mentioned patent application is incorporated herein by reference in its entirety

TECHNICAL FIELD

The present invention relates to telescopic water pipes, and in particular, to a four-layer-structured water passing device.

BACKGROUND

Currently, the existing telescopic water pipe on the market is an elastic tube made of latex, rubber or a TPR (thermoplastic rubber) elastomer as a raw material. Due to the high elasticity of the telescopic water pipe, when the telescopic water pipe is connected with 3-10 kg of pressurized water, under the protection by the outer sheath, the radial water-passing area and longitudinal length of the telescopic water pipe can be expanded to extend by 2-4 times; and when the pressurized water source is turned off, under the resilience force of the inner core elastic tube, the telescopic water pipe quickly discharges the residual water in the pipe and retracts to the original product size. Therefore, the telescopic water pipe is easy to use, small in size, and is very popular among customers at home and abroad.

However, currently the service life of the telescopic water pipe on the market is too low to meet people's expectations. Through detailed market research, it shows that 70% of the damage and water leakage of the telescopic water pipe in use occur at a joint mechanism portion and due to tear caused by strong friction between an inner tube and a cloth sheath. The main factors causing the damage are as follows. 1. In order to prevent the elastic inner tube and the outer sheath from falling off under the action of a high-pressure fluid applied in the elastic inner tube, currently the joint mechanism of the telescopic water pipe on the market generally adopts the manner in which the elastic inner tube and cloth sheath of the telescopic water pipe are strongly buckled together by a buckle (an aluminum buckle, etc.), such that the elastic inner tube is permanently deformed as it is subjected to a strong locking force for a long time, and tear and break are easily to occur at where permanent deformation occurs under the action of the high-pressure water. A joint mechanism disclosed in the Chinese patent no. CN104976466 adopts the manner in which the elastic inner tube and one end of a non-elastic outer sheath of the telescopic water pipe are strongly locked onto a joint adapter through the fitting of a traveling nut, a locking fastener provided with a slot (or a locking tongue) and the joint adapter, such that the elastic inner tube is permanently deformed as it is subjected to strong locking by the locked fastener. Many water leakage phenomena occur at the joint potion during the practical use of a telescopic water pipe employing such a joint mechanism structure. A more serious problem is that under the long-time action of the high-pressure fluid, the elastic inner tube is permanently thinned, and thus the buckle become loosened, resulting in easily falling off the inner tube and the outer sheath. 2. Currently, the telescopic water pipe on the market has a simple structure and is not provided with any multi-protection stress-relieving protection sleeve, such that when the telescopic water pipe receives the pressurized fluid, the strong fluctuating friction between the elastic inner tube and the outer sleeve cannot be reduced.

Some conventional designs have attempted to address these drawbacks in the art, such as the Chinese patent application no. 201320166720.6, which discloses a utility model entitled "TELESCOPIC WATER PIPE PROVIDED WITH PLASTIC FILM THEREIN." In this utility model, one layer of plastic film is additionally used between a water-passing inner core rubber tube and a crumpled outer sheath to reduce the degree of friction tear. However, as the plastic film has no elasticity and is not wear-resistant, in specific implementation of the technical solution the film is broken upon stretching out and drawing back for about forty times, and the broken film debris appears in clusters when the number of stretching out and drawing back reaches about sixty. The resultant clustered debris further increases the friction of the water-passing inner core of the telescopic water pipe. Therefore, although this solution has a certain protective effect on the water-passing inner core in the earlier stage of use, after the number of uses reaches about 60 it will instead exert the effect of increasing the friction tear stress on the water-passing inner core, and thus it has not really solved the problem of improving the service life of the telescopic water pipe.

In another conventional device disclosed in Chinese patent no. CN107524869, a hose device is provided, which includes an outer tube made of a flexible material and an inner tube made of an elastic material for transferring a fluid through the hose device, where due to the action of the elastic inner tube, when the interior of the elastic inner tube has no fluid pressure, the hose device has a shorter length at a contracted state, and when the interior of the elastic inner tube is applied with a pressured fluid, the hose device has a longer length at an expanded state; the outer tube has a fluctuating state when the hose device is at the contracted state, and the outer tube is used to control and receive the expansion of the inner tube when the hose device is at the expanded state, where at least one sleeve portion is disposed between the elastic inner tube and the outer tube along at least one portion of the length of the elastic inner tube for protecting the elastic inner tube from abrasion caused by the fluctuation of the outer tube, and in the at least one portion of the length of the inner tube, the outer tube fluctuates at the contracted state. However, the hose device also has some potential disadvantages: firstly, a metal eyelet fastener (an aluminum buckle, etc.) is used at a joint mechanism to overlap the elastic inner tube, the protective sleeve, and one end of the outer sheath of the hose device together, and to strongly lock the same onto an adapter, thus this joint mechanism is not easy to assemble and disassemble, and although the protective sleeve is added in the joint mechanism, it still fails to solve the permanent deformation damage to the elastic inner tube caused by the long-time strong locking force, and thus the risk of tear break caused by the action of the high pressure fluid cannot be avoided; secondly, in the hose device multiple sleeves are arranged along the length of the elastic inner tube between the elastic inner tube and the outer tube (generally what can be assembled is to provide one sleeve at each of two ends of the hose device, the end of each sleeve being combined with the outer sheath and the elastic inner tube through a structural member and an adapter); the elastic sleeve is used as the protective layer between the elastic inner tube and the outer sheath, and although it can isolate the friction of the outer sheath fluctuation to the elastic inner tube, the friction coefficient of the elastic sleeve and the outer cloth sheath is large, and there is no barrier layer for protection between the elastic sleeve and the outer cloth sheath, such that after a period of use, the elastic protection sleeve will fail due to break caused by the fluctuation of the outer cloth sheath, and there is a risk of failing to effectively protect the elastic inner tube; and additionally, since the structural member is added into the hose device, stress concentration is liable to be formed on both sides of the structural member by the elastic inner tube to which the fluid pressure is applied, thereby increasing the break risk of the elastic inner tube.

Therefore, it would be desirable to provide a telescopic water pipe that is not liable to be broken due to abrasion, stress, and the like, to thereby prolong the service life of the telescopic water pipe. Furthermore, it would be desirable to facilitate the maintenance and replacement of the joint portion of the telescopic water pipe.

SUMMARY

To achieve the above objective, the present invention provides the following solution in one embodiment. A four-layer-structured water passing device is provided, including: an elastic inner tube and an outer cloth sheath, wherein the exterior of the elastic inner tube is sleeved with a first sleeve, the exterior of the first sleeve is sleeved with a second sleeve, and the outer cloth sheath is sleeved on the exterior of the second sleeve, both the elastic inner tube and the first sleeve are made of an elastic material, the second sleeve and the outer cloth sheath are synchronously extended and synchronously folded, and a gap existed between the second sleeve and the first sleeve; an inner-core cone connector and a first conical sleeve chuck are disposed at both ends of the elastic inner tube, the inner-core cone connector has a water passing hole, one end of the inner-core cone connector is inserted into the inner cavity of the elastic inner tube, the first conical sleeve chuck is sleeved on the exterior of the first sleeve, the inner-core cone connector cooperates with the first conical sleeve chuck to enable clamping of the elastic inner tube and the first sleeve, a second conical sleeve chuck is sleeved on the exteriors of the second sleeve and the outer cloth sheath, a union is sleeved on the exterior of the second conical sleeve chuck, and the second conical sleeve chuck cooperates with the union to enable tight pressing of the second sleeve and the outer cloth sheath onto the first conical sleeve chuck; and two ends of the elastic inner tube are respectively provided with a first joint and a second joint, the first joint and the second joint are respectively sleeved on the exterior of the inner-core cone connector, the first joint and the second joint each has a through hole which is communicated with the water passing hole, the first joint and the second joint are respectively threadably connected to the union, and the first joint and the second joint are configured to be connected to an external water source and a water utilization component.

In one aspect, an inner diameter of the first sleeve is equal to or greater than an outer diameter of the elastic inner tube, and a diameter of the second sleeve is equal to or smaller than the diameter of the outer cloth sheath; and under the action of a tensile force, the length of each of the elastic inner tube and the first sleeve is longer than the stretched length of the outer cloth sheath, and the stretched length of the second sleeve is greater than or equal to the stretched length of the outer cloth sheath.

In another aspect, the elastic inner tube and the first sleeve are synchronously stretched out and drawn back; the elastic inner tube is made of a high-elastic rubber tube, the first sleeve is made of a rubber-plastic elastic material, the second sleeve and the outer cloth sheath are synchronously extended and synchronously folded, the second sleeve is made of a wrinkle-able plastic film sleeve or a telescopic plastic film sleeve which can be regularly folded, the second sleeve is processed from a PE (polyethylene), PET (polyethylene terephthalate), PVC (polyvinyl chloride) or PU (polyurethane) material, and the outer cloth sheath is made of polyester yarns or nylon yarns through knitting.

In a further aspect, the end of the inner-core cone connector which is inserted into the elastic inner tube has a tapered protrusion, the other end of the inner-core cone connector is provided with an annular sealing groove, the inner-core cone connector is connected with the first joint and the second joint respectively through plug-in, a sealing ring is disposed between the inner-core cone connector and the first joint and the second joint, the sealing ring is disposed in the annular sealing groove, and a convex spacing ring is further disposed between the tapered protrusion and the annular sealing groove.

In some embodiments, the first conical sleeve chuck has thereon a protrusion which is matched with the tapered protrusion, and the outer side wall of the first conical sleeve chuck at the end away from the inner-core cone connector is also provided with an annular ridge.

In yet another aspect, both ends of the second conical sleeve chuck are provided with slots, the opening directions of the slots are opposite and staggered, and the axial direction of the slots is parallel to the axial direction of the second conical sleeve chuck.

In one aspect, the union has an arc-shaped structure which is recessed toward the axial direction thereof, the arc-shaped structure cooperates with the second conical sleeve chuck to clamp the second sleeve and the outer cloth sheath, and the union has an anti-skid pattern on the outer side wall thereof.

In a further aspect, the first joint and the second joint are provided with one of the following structures at an end away from the union: a quick-connect connection structure, an internally threaded joint structure or an externally threaded joint structure.

Compared with conventional designs, the embodiments of the present invention achieve the following technical effects. The four-layer-structured water passing device includes an elastic inner tube and an outer cloth sheath, where the exterior of the elastic inner tube is sleeved with a first sleeve, the exterior of the first sleeve is sleeved with a second sleeve, and the outer cloth sheath is sleeved on the exterior of the second sleeve, both the elastic inner tube and the first sleeve are made of an elastic material, and the diameter of the first sleeve is greater than or equal to that of the elastic inner tube, the second sleeve and the outer cloth sheath are synchronously extended and synchronously folded, the diameter of the second sleeve is greater than or equal to that of the outer cloth sheath, and a gap existed between the second sleeve and the first sleeve. In the water passing device, the first sleeve is disposed outside the elastic inner tube, the second sleeve is disposed in the outer cloth sheath, the elastic inner tube and the first sleeve are synchronously stretched out and drawn back with relatively small mutual friction between them; the outer cloth sheath and the second sleeve are synchronously folded and synchronously extended, also with small friction between them, the arrangement of the first sleeve and the second sleeve avoids direct friction between the elastic inner tube and the outer cloth sheath, and when the water passing device is connected with the pressurized water source, the first sleeve can quickly eliminate or reduce the impact wave strength when receiving a strong expansion impact from the elastic inner tube, the first sleeve is made of an elastic material such that the first sleeve can gently transmit the fluctuation to the second sleeve and the second sleeve extends the outer cloth sheath to the limit length of the outer cloth sheath, so as to avoid damage caused by frequent direct contact friction between the elastic inner tube and the outer cloth sheath, and additionally the first sleeve and the second sleeve as set can effectively prevent sewage and small hard objects (e.g., grains of sand) from entering the surface of the elastic inner tube, further eliminating or reducing the risk that the surface of the elastic inner tube is broken as cut by hard objects; at the same time, an inner-core cone connector and a first conical sleeve chuck are set to clamp the elastic inner tube and the first sleeve, a second conical sleeve chuck and a union are set to press the second sleeve and the outer cloth sheath tightly onto the first conical sleeve chuck, and such a split-type locking structure increases the locking force when the water-source pressure is increased, and reduces the locking force when the water-source pressure is reduced, avoiding permanent deformation and abrasion at the joint position between the elastic inner tube and the outer cloth sheath, and prolonging the service life of the water passing device. In addition, by setting the inner-core cone connector, the first conical sleeve chuck, the second conical sleeve chuck and the threaded union, the device is easy to install and disassemble, which solves the technical problem in the prior art that replacement cannot be conducted when the aluminum buckle is used for fixation. Therefore, even in the case of partial damage to the elastic inner tube or the sleeves, the user can also quickly and conveniently conduct disassembly and replacement, which better meets the requirements of a customer.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

Figure 1:
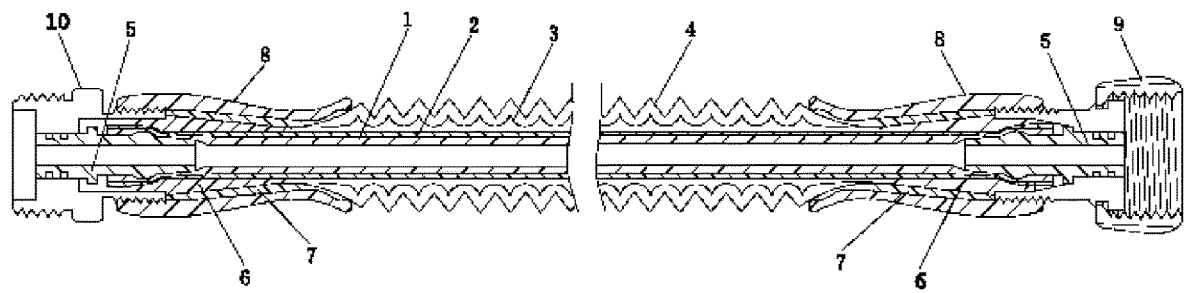
FIG. 1 is a cross-sectional view of a four-layer-structured water passing device according to a first embodiment of the present invention.
Figure 2:
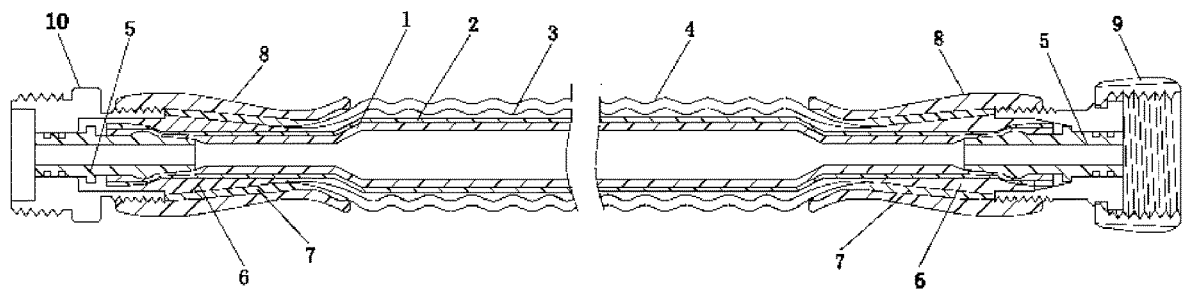
FIG. 2 is a cross-sectional view of the four-layer-structured water passing device of FIG. 1 but shown in a stretched state when the device is filled with water by connecting to a pressurized water source.
Figure 3:
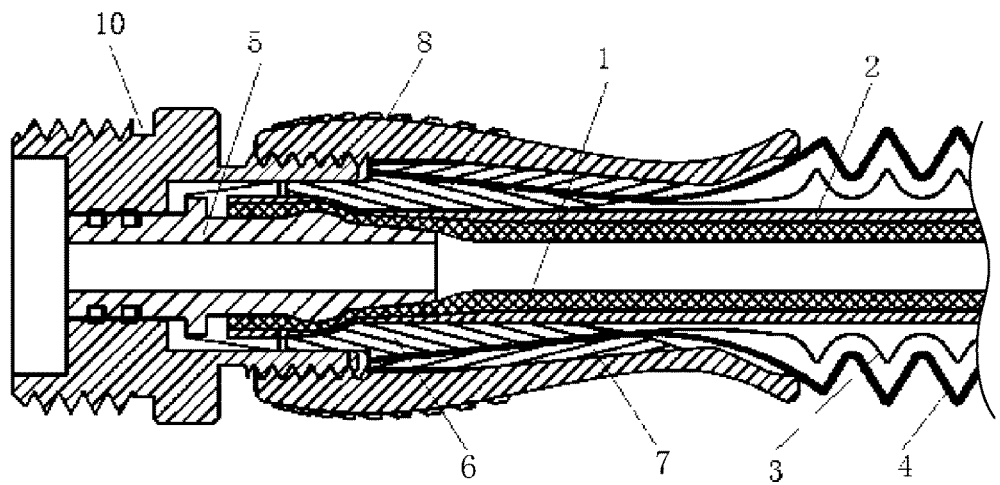
FIG. 3 is an enlarged view of a portion of the water passing device of FIG. 1.
Figure 4:
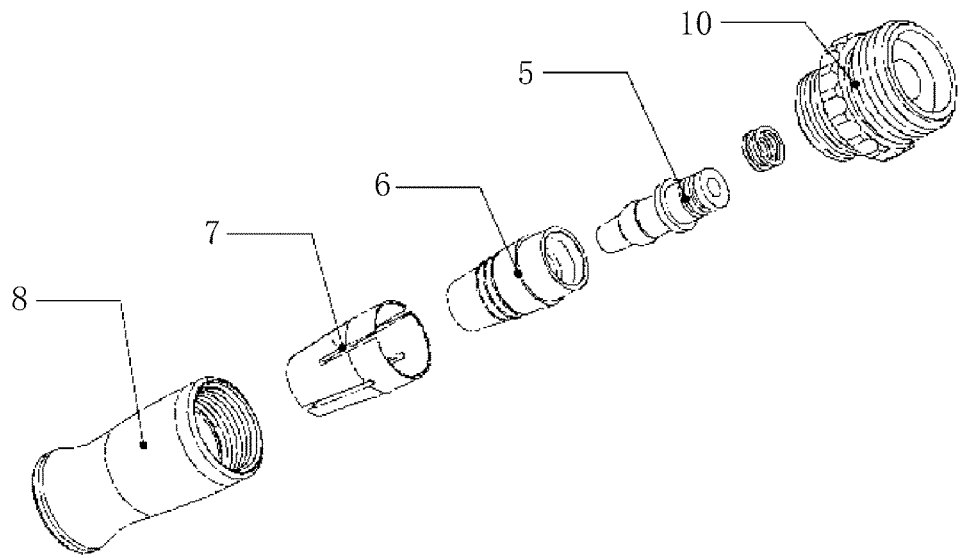
FIG. 4 is a perspective exploded view of the portion of the water passing device of FIG. 3.
Figure 5:
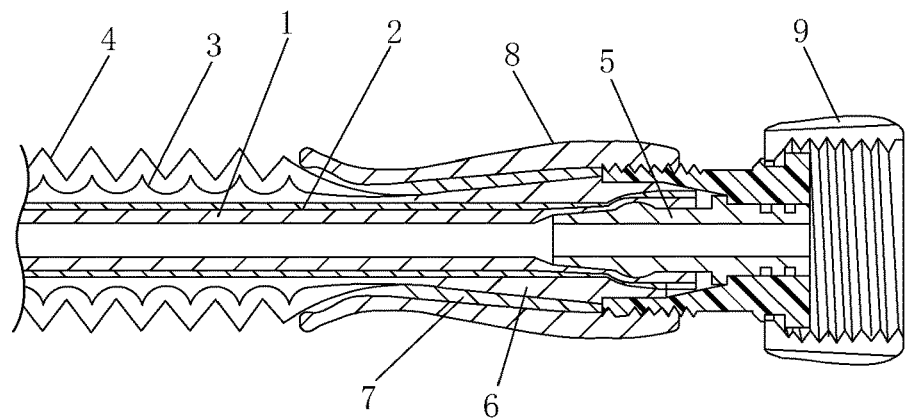
FIG. 5 is an enlarged structural view of another portion of the water passing device of FIG. 1.
Figure 6:
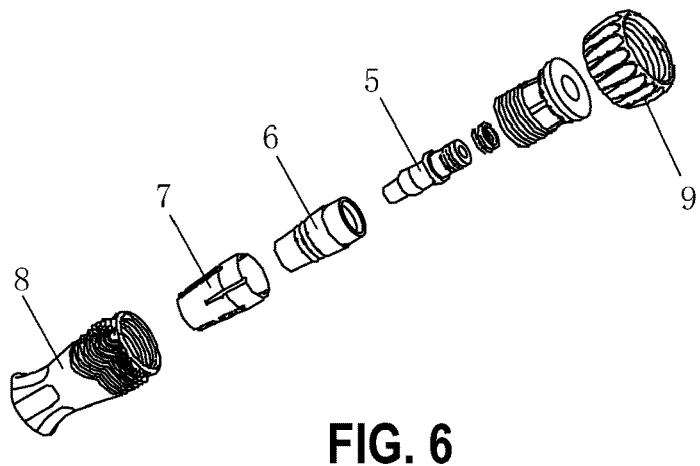
FIG. 6 is a perspective exploded view of the portion of the water passing device of FIG. 5.

The following clearly and completely describes the technical solutions in the embodiments of the present invention with reference to the accompanying drawings in the embodiments of the present invention. To make objectives, features, and advantages of the present invention clearer, the following describes embodiments of the present invention in more detail with reference to accompanying drawings and specific implementations.

An objective of the present invention is to provide a four-layer-structured water passing device, to solve the problems described above, to improve the phenomenon that the telescopic water pipe is liable to be damaged due to friction and stress concentration, and to prolong the service life of the telescopic water pipe.

Embodiment 1

In the first embodiment of the present invention, a four-layer-structured water passing device includes an elastic inner tube 1 and an outer cloth sheath 4, where the exterior of the elastic inner tube 1 is sleeved with a first sleeve 2, the exterior of the first sleeve 2 is sleeved with a second sleeve 3, and the outer cloth sheath 4 is sleeved on the exterior of the second sleeve 3. Both the elastic inner tube 1 and the first sleeve 2 are made of an elastic material, and the diameter of the first sleeve 2 is greater than or equal to that of the elastic inner tube 1. The second sleeve 3 is a bamboo-joint-like telescopic plastic film sleeve which can be regularly folded, the outer cloth sheath 4 is a bamboo-joint-like telescopic cloth sheath which can be regularly folded, the inner diameter of the outer cloth sheath 4 is greater than or equal to the outer diameter of the second sleeve 3, and they are gap-fitted. The second sleeve 3 is made of an elastic material, and a gap existed between the second sleeve 3 and the first sleeve 2.

In the water passing device, a first sleeve 2 is disposed outside the elastic inner tube 1, a second sleeve 3 is disposed outside the outer cloth sheath 4, the elastic inner tube 1 and the first sleeve 2 are synchronously stretched out and drawn back with relatively small mutual friction between them, and the mutual friction between the outer cloth sheath 4 and the second sleeve 3 is relatively small. The arrangement of the first sleeve 2 and the second sleeve 3 avoids direct friction between the elastic inner tube 1 and the outer cloth sheath 4. That is, the fluctuating friction between the elastic inner tube 1 and the outer cloth sheath 4 is converted into a fluctuating friction between the first sleeve 2 and the second sleeve 3. When the water passing device is connected with the pressurized water source, the first sleeve 2 can quickly eliminate or reduce the impact wave strength when receiving a strong expansion impact from the elastic inner tube 1. Both the first sleeve 2 and the second sleeve 3 are made of an elastic material, such that the first sleeve 2 can gently transmit the fluctuation to the second sleeve 3, and the second sleeve 3 extends the outer cloth sheath 4 to the limit length of the outer cloth sheath 4, so as to avoid damage caused by frequent direct contact friction between the elastic inner tube 1 and the outer cloth sheath 4. It should be noted that, in the specific embodiment, the second sleeve 3 and the outer cloth sheath 4 have consistent wrinkles and can be synchronously extended and synchronously folded.

An inner-core cone connector 5 and a first conical sleeve chuck 6 are disposed at both ends of the elastic inner tube 1. The inner-core cone connector 5 has a water passing hole. One end of the inner-core cone connector 5 is inserted into the inner cavity of the elastic inner tube 1. The first conical sleeve chuck 6 is sleeved on the exterior of the first sleeve 2. The inner-core cone connector 5 cooperates with the first conical sleeve chuck 6 to enable clamping of the elastic inner tube 1 and the first sleeve 2. A second conical sleeve chuck 7 is sleeved on the exteriors of the second sleeve 3 and the outer cloth sheath 4. A union 8 is sleeved on the exterior of the second conical sleeve chuck 7. The second conical sleeve chuck 7 cooperates with the union 8 to enable tight pressing of the second sleeve 3 and the outer cloth sheath 4 onto the first conical sleeve chuck 6. Two ends of the elastic inner tube 1 are respectively provided with a first joint 9 and a second joint 10. The first joint 9 and the second joint 10 are respectively sleeved on the exterior of the inner-core cone connector 5. The first joint 9 and the second joint 10 each has a through hole which is communicated with the water passing hole. The first joint 9 and the second joint 10 are respectively threadably connected to the union 8. The first joint 9 and the second joint 10 are configured to be respectively connected to an external water source and a water utilization component.

In the water passing device, the inner-core cone connector 5 is inserted into the inner cavity of the elastic inner tube 1, the first conical sleeve chuck 6 is sleeved on the exterior of the first sleeve 2, and the inner-core cone connector 5 cooperates with the first conical sleeve chuck 6 to enable clamping of the elastic inner tube 1 and the first sleeve 2, and while the water passing device is connected with the pressurized water source, when the water-source pressure is increased, under the action of the water pressure the inner-core cone connector 5 fits more tightly with the elastic inner tube 1, and the locking force applied by the inner-core cone connector 5 and the first conical sleeve chuck 6 to the elastic inner tube 1 and the first sleeve 2 is increased; the second conical sleeve chuck 7 is sleeved on the exteriors of the second sleeve 3 and the outer cloth sheath 4, the exterior of the second conical sleeve chuck 7 is sleeved with the union 8, and the second conical sleeve chuck 7 cooperates with the union 8 to enable tight pressing of the second sleeve 3 and the outer cloth sheath 4 onto the first conical sleeve chuck 6, and similarly, when the water-source pressure is increased, the locking force applied by the second conical sleeve chuck 7 and the union 8 to the second sleeve 3 and the outer cloth sheath 4 is increased; and when the water-source pressure is lowered, the locking force applied by the inner-core cone connector 5 and the first conical sleeve chuck 6 to the elastic inner tube 1 and the first sleeve 2 is reduced, and correspondingly the locking force applied by the second conical sleeve chuck 7 and the union 8 to the second sleeve 3 and the outer cloth sheath 4 is reduced. That is, the connecting portion of the water passing device can reduce the locking force on the elastic inner tube 1 and the outer cloth sheath 4 as the water-source pressure is reduced, so as to protect the elastic inner tube 1 and the outer cloth sheath 4 from being abraded at the joint portion as caused by permanent deformation, effectively avoiding the problem that the service life of the telescopic water pipe is reduced due to water leakage at the joint portion.

Particularly, in the case where the elastic inner tube 1 and the first sleeve 2 are elastically deformed under the action of the tensile force, the length of each of the elastic inner tube 1 and the first sleeve 2 is longer than the stretched length of the outer cloth sheath 4; and the stretched length of the second sleeve 3 is longer than the stretched length of the outer cloth sheath 4. The stretched length of the outer cloth sheath 4 limits the deformation degree of the elastic inner tube 1 and the first sleeve 2, which prevents damage to the elastic inner tube 1 and the first sleeve 2 as caused by plastic deformation and prolongs the service life of the water passing device.

More specifically, the end of the inner-core cone connector 5 which is inserted into the elastic inner tube 1 has a tapered protrusion, and the other end of the inner-core cone connector 5 is provided with an annular sealing groove. The inner-core cone connector 5 connects to the first joint 9 and the second joint 10 respectively through plug-in, and a sealing ring is disposed between the inner-core cone connector 5 and the first joint 9 and the second joint 10, such that the inner-core cone connector 5 is connected respectively with the first joint 9 and the second joint 10 more tightly. The sealing ring is disposed in the annular sealing groove, and a convex spacing ring is further disposed between the tapered protrusion and the annular sealing groove to limit a connection limit position of the inner-core cone connector 5 with the first joint 9 (the second joint 10) and the elastic inner tube 1.

Additionally, the first conical sleeve chuck 6 has thereon a protrusion which is matched with the tapered protrusion. The protrusion of the first conical sleeve chuck 6 cooperates with the tapered protrusion of the inner-core cone connector 5 to make the elastic inner tube 1 fit more tightly with the first sleeve 2, and meanwhile to prevent the elastic inner tube 1 and the first sleeve 2 from slipping off between the first conical sleeve chuck 6 and the inner-core cone connector 5. The outer side wall of the first conical sleeve chuck 6 at the end away from the inner-core cone connector 5 is also provided with an annular ridge, which increases the friction between the second sleeve 3 and the first conical sleeve chuck 6 and thus enhances the locking force.

Furthermore, both ends of the second conical sleeve chuck 7 are provided with slots. The opening directions of the slots are opposite and staggered, and the axial direction of the slots is parallel to the axial direction of the second conical sleeve chuck 7. The staggered manner of the openings ensures that the second conical sleeve chuck 7 has a certain relaxation degree and a certain contraction force.

The union 8 has an arc-shaped structure which is recessed toward the axial direction thereof. The arc-shaped structure can cooperate with the second conical sleeve chuck 7 to clamp the second sleeve 3 and the outer cloth sheath 4. The union 8 has a relatively smaller inner diameter at the arc-shaped structure, and thus the second conical sleeve chuck 7 is compressed to press the second sleeve 3 and the outer cloth sheath 4 tightly onto the first conical sleeve chuck 6. The union 8 has an anti-skid pattern on the outer side wall thereof, and thus is skid-resistant and easy to operate.

The first joint 9 is provided with an internally threaded joint structure at one end away from the union 8, and the second joint 10 is provided with an externally threaded joint structure at one end away from the union 8, such that quick and stable connection with the water source and the water utilization component is enabled.

Furthermore, the elastic inner tube 1 is made of a high-elastic latex tube, and the first sleeve 2 is made by coating an elastic material onto the outer wall of the elastic inner tube 1, such that the first sleeve 2 fits tightly with the elastic inner tube 1 to improve the fluctuation consistency between the first sleeve 2 and the elastic inner tube 1. The second sleeve 3 is processed from a PE, PET, PVC or PU material, and the outer cloth sheath 4 is made of polyester yarns or nylon yarns through knitting.

Embodiment 2

Figure 7:
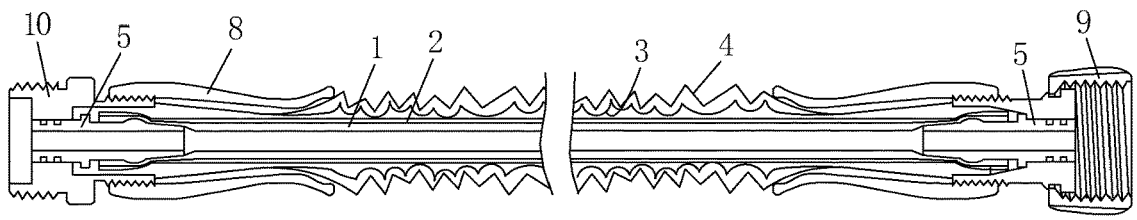
FIG. 7 is a cross-sectional view of a four-layer-structured water passing device according to a second embodiment of the present invention.
Figure 8:
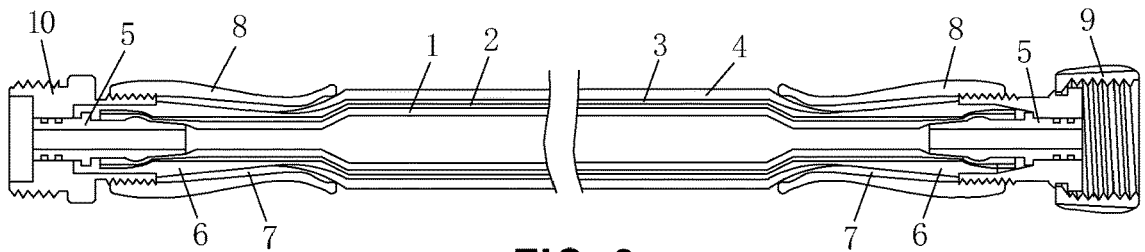
FIG. 8 is a cross-sectional view of the four-layer-structured water passing device of FIG. 7 but shown in a stretched state when the device is filled with water by connecting to a pressurized water source.
Figure 9:
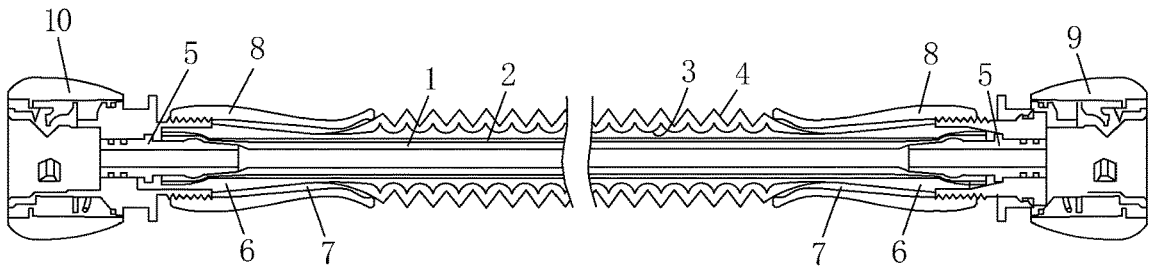
FIG. 9 is a cross-sectional view of a four-layer-structured water passing device according to a third embodiment of the present invention.
Figure 10:
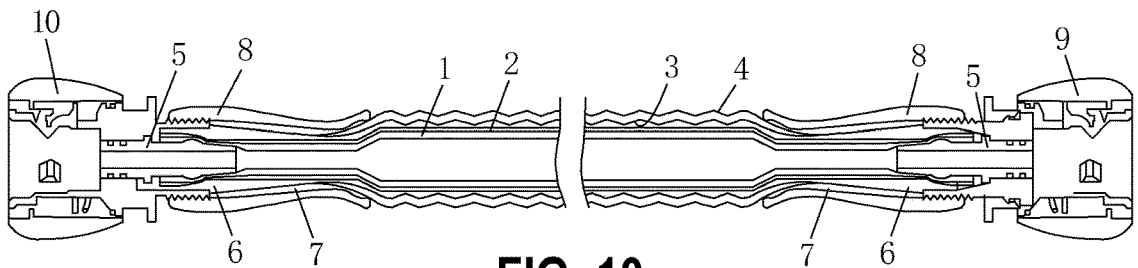
FIG. 10 is a cross-sectional view of the four-layer-structured water passing device of FIG. 9 but shown in a stretched state when the device is filled with water by connecting to a pressurized water source.
Figure 11:
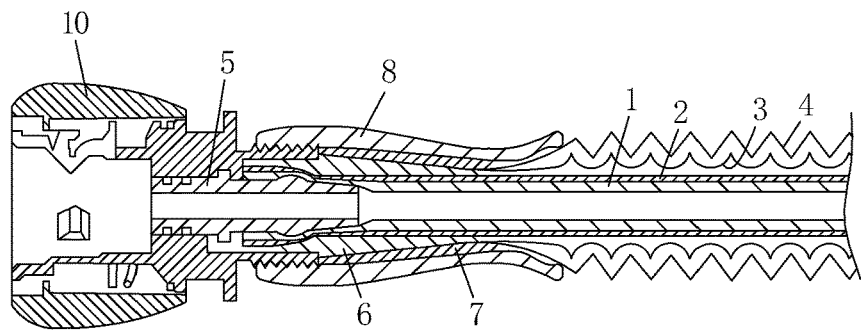
FIG. 11 is an enlarged view of a portion of the water passing device of FIG. 9.
Figure 12:
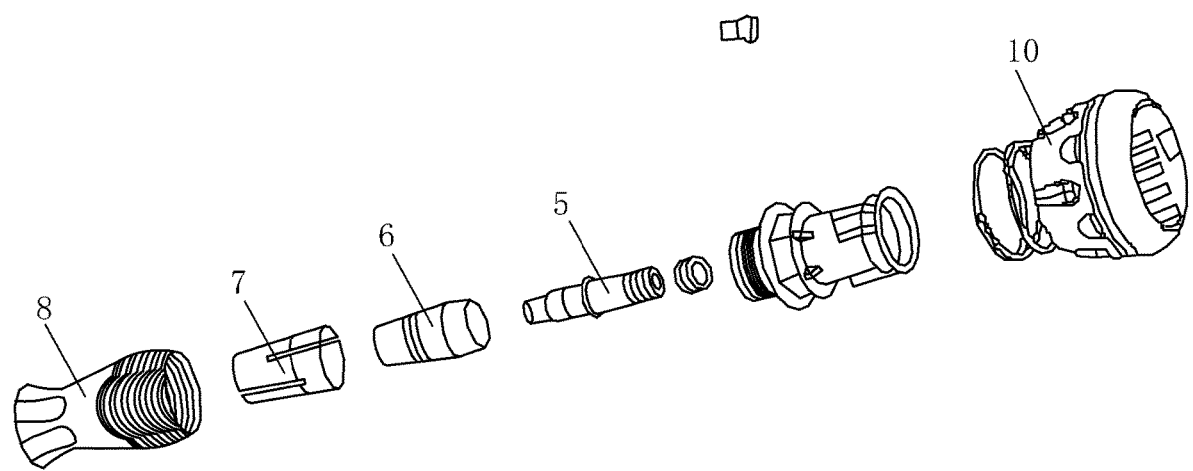
FIG. 12 is a perspective exploded view of the portion of the water passing device of FIG. 11.

In this second embodiment, the elastic inner tube 1 adopts a high-elastic rubber tube, the first sleeve 2 is made of a rubber-plastic elastic material, the second sleeve 3 is made of a wrinkle-able PU film, and the outer cloth sheath 4 is made of a wrinkle-able nylon cloth sheath. The friction between the first sleeve 2 and the second sleeve 3 still can replace the friction between the outer cloth sheath 4 and the first sleeve 2, to prolong the service life of the device. Specifically, referring to FIGS. 7 and 8, the elastic inner tube 1 and the first sleeve 2 are synchronously stretched out and drawn back, the second sleeve 3 and the outer cloth sheath 4 are synchronously extended and synchronously folded, and the fitting between the first sleeve 2 and the second sleeve 3 can replace the fluctuating friction between the elastic inner tube 1 and the outer cloth sheath 4.

The elastic inner tube 1 is made of a high-elastic rubber tube; the first sleeve 2 is prepared by coating a rubber-plastic elastic material on the outer surface of the elastic inner tube 1 via a special apparatus to form a first sleeve 2 capable of fitting tightly with the elastic inner tube 1, and the stretched length of the first sleeve 2 under a low tensile force is greater than the designed stretched length of the outer cloth sheath 4; the second sleeve 3 is prepared by blowing a PU raw material through a special plastic sheet machine, and when the elastic inner tube 1 is contracted by resilience, the softness of the PU film sleeve can complete wrinkling in response to the wrinkles of the outer cloth sheath 4; the stretched length of the second sleeve 3 is slightly greater than or equal to the designed stretched length of the outer cloth sheath 4; the outer cloth sheath 4 is prepared by knitting high-strength nylon yarns into a wrinkle-able plain-weave nylon outer cloth sheath through a ribbon loom, and when the elastic inner tube 1 is contracted by resilience, the nylon outer cloth sheath 4 can wrinkle in response to the contraction of the elastic inner tube 1; and the completely stretched length of the nylon outer cloth sheath 4 is set to be three times higher than that of the elastic inner tube 1.

There are two protection sleeves with different performances between the elastic inner tube 1 and the outer cloth sheath 4, such that the elastic inner tube 1 of the water passing device is double protected, which greatly prolongs the service life of the product. The elastic inner tube 1 and the first sleeve 2 are synchronously stretched out and drawn back, the relative fluctuation between them is very small, and the friction abrasion can be negligible; the second sleeve 3 and the outer cloth sheath 4 are synchronously extended and synchronously folded, the relative fluctuation between them is very small, and the mutual friction between them is very small. Therefore, the fluctuating friction between the elastic inner tube 1 and the outer cloth sheath 4 of the water passing device has been converted into the fitting between the first sleeve 2 and the second sleeve 3. When the water passing device is connected to the pressurized water source, the first sleeve 2 of the rubber-plastic elastic material can quickly eliminate or reduce the impact wave strength when receiving a strong expansion impact from the elastic inner tube 1, such that the first sleeve 2 can gently transmit the fluctuation to the second sleeve 3; the second sleeve 3 which adopts a plastic sleeve has plastic commonality with the first sleeve 2, and the mutual-fitting friction coefficient is very low, so that under the action of the pressurized water source the elastic inner tube 1 can be quickly extended to the limit length of the outer cloth sheath 4.

Embodiment 3

In this third embodiment, the first joint 9 and the second joint 10 are each provided with a quick-connect connection structure at one end away from the union 8, such that quick and stable connection with the water source and the water utilization component is enabled, and the working efficiency is improved. Specifically, referring to FIGS. 9 to 12, the elastic inner tube 1 is adopts a high-elastic latex tube with the selected specification of 6×9.5 (with an inner diameter of 6 mm and an outer diameter of 9.5 mm); the first sleeve 2 adopts a rubber-plastic elastic material sleeve with the specification of 9.5×10 (with an inner diameter of 9.5 mm and an outer diameter of 10 mm); the second sleeve 3 adopts a PE film sleeve which can be folded regularly in response to the outer cloth sheath, and has a wall thickness of 0.05 mm and a folding diameter of 30 mm; and the outer cloth sheath 4 is a telescopic woven cloth sheath which can be folded regularly and has a folding diameter of 32 mm.

The preparation method of the first sleeve 2: the rubber-plastic elastic material can be coated on the outer surface of the elastic inner tube through a special apparatus to form the first sleeve 2 which can tightly fit the elastic inner tube 1; and the stretched length of the first sleeve 2 under a low tensile force is greater than the designed stretched length of the outer cloth sheath 4.

The preparation method of the second sleeve 3: a PE raw material is processed into a PE film sleeve through a plastic film blowing machine, and when the elastic inner tube is contracted by resilience, the softness of the PU film sleeve can complete wrinkling in response to the regular folding of the outer cloth sheath 4; and the stretched length of the second sleeve 3 is slightly greater than or equal to the designed stretched length of the outer cloth sheath 4.

The preparation method of the outer cloth sheath 4: polyester yarns are knitted into a bamboo-joint-like woven cloth sheath through a disc knitting machine, and when the elastic inner tube is contracted by resilience, the bamboo joints on the woven sheath are drawn close to one another to complete the regular folding.

The elastic inner tube 1 and the first sleeve 2 are synchronously stretched out and drawn back, and the second sleeve 3 and the outer cloth sheath 4 are synchronously extended and synchronously folded; and the fitting between the first sleeve 2 and the second sleeve 3 can replace the fluctuating friction between the elastic inner tube 1 and the outer cloth sheath 4.

In this embodiment, the union 8 is a large nut tail cap with an arc tail structure. The tail end of the large nut tail cap is added with an 18 mm stress-relieving arc tail structure. The arc tail structure adopts an arc-forward flared inner cavity. The tail diameter of the inner cavity is equal to or slightly larger than the outer diameter of the outer cloth sheath 4 when the outer cloth sheath is connected to the pressurized water source and expanded to full. The minimum diameter of the inner cavity is slightly larger than the diameter of the elastic inner tube 1 plus the wall thickness of the first sleeve 2, the wall thickness of the second sleeve 3 and the diameter of the wall thickness of the outer cloth sheath 4 before expansion. The arc tail structure of the union 8 can effectively eliminate or reduce the stress concentration generated at the joint when water passes through the elastic inner tube 1, so that the overall pressure bearing capacity of the water passing device is increased.

The four-layer-structured water passing device of the present invention has a four-layer structure and includes two layers of sleeves between the elastic inner tube 1 and the outer cloth sheath 4. When one end of the water passing device is connected to the pressurized water source, two sleeves with different performances can greatly reduce the fluctuating friction between the elastic inner tube 1 and the outer cloth sheath 4. That is, the fluctuating friction between the elastic inner tube 1 and the outer cloth sheath 4 is converted into a fluctuating friction between the first sleeve 2 and the second sleeve 3, such that the water passing device is extended gently and smoothly, and when the pressurized water source is turned off, the water passing device can be gently and smoothly retracted to the original length, so as to avoid damage caused by frequent direct contact friction between the elastic inner tube 1 and the outer cloth sheath 4.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

The embodiments described above are only descriptions of preferred embodiments of the present invention and are not intended to limit the scope of the present invention. Various variations and modifications can be made to the technical solution of the present invention by those of ordinary skill in the art, without departing from the design and spirit of the present invention. The variations and modifications should all fall within the claimed scope defined by the claims of the present invention.

What is claimed is:

1. A four-layer-structured water passing device, comprising:
    an elastic inner tube and an outer cloth sheath, wherein the exterior of the elastic inner tube is sleeved with a first sleeve, the exterior of the first sleeve is sleeved with a second sleeve, and the outer cloth sheath is sleeved on the exterior of the second sleeve, both the elastic inner tube and the first sleeve are made of an elastic material, the second sleeve and the outer cloth sheath are synchronously extended and synchronously folded, and a gap existed between the second sleeve and the first sleeve, wherein the first sleeve is a rubber-plastic elastic material sleeve formed from a rubber-plastic elastic material, the second sleeve is a PE film sleeve formed from a polyethylene material and which is folded regularly in response to movements of the outer cloth sheath, and the second sleeve is formed by processing the polyethylene material through a plastic film blowing machine such that the second sleeve defines a greater stretched length than a stretched length of the outer cloth sheath that is to be sleeved on the exterior of the second sleeve;
    an inner-core cone connector and a first conical sleeve chuck disposed at both ends of the elastic inner tube, wherein the inner-core cone connector has a water passing hole, one end of the inner-core cone connector is inserted into an inner cavity of the elastic inner tube, the first conical sleeve chuck is sleeved on the exterior of the first sleeve, the inner-core cone connector cooperates with the first conical sleeve chuck to enable clamping of the elastic inner tube and the first sleeve, a second conical sleeve chuck is sleeved on exteriors of the second sleeve and the outer cloth sheath, a union is sleeved on the exterior of the second conical sleeve chuck, and the second conical sleeve chuck cooperates with the union to enable tight pressing of the second sleeve and the outer cloth sheath onto the first conical sleeve chuck, wherein the union is an arc tail structure when viewed in cross-section along an inner and outer periphery thereof, the arc tail structure adopting an arc-forward flared inner cavity; and
    two ends of the elastic inner tube are respectively provided with a first joint and a second joint, the first joint and the second joint are respectively sleeved on the exterior of the inner-core cone connector, the first joint and the second joint each has a through hole which is communicated with the water passing hole, the first joint and the second joint are respectively threadably connected to the union, and the first joint and the second joint are respectively configured to be connected to an external water source and a water utilization component.

2. The four-layer-structured water passing device of claim 1, wherein an inner diameter of the first sleeve is equal to or greater than an outer diameter of the elastic inner tube, and a diameter of the second sleeve is equal to or smaller than the diameter of the outer cloth sheath; and under action of a tensile force, a length of each of the elastic inner tube and the first sleeve is longer than a stretched length of the outer cloth sheath.

3. The four-layer-structured water passing device of claim 1, wherein the elastic inner tube and the first sleeve are synchronously stretched out and drawn back; the elastic inner tube is made of a high-elastic rubber tube, the second sleeve and the outer cloth sheath are synchronously extended and synchronously folded, the second sleeve is made of a wrinkle-able plastic film sleeve or a telescopic plastic film sleeve which can be regularly folded, and the outer cloth sheath is made of polyester yarns or nylon yarns through knitting.

4. The four-layer-structured water passing device of claim 1, wherein an end of the inner-core cone connector which is inserted into the elastic inner tube has a tapered protrusion, another end of the inner-core cone connector is provided with an annular sealing groove, the inner-core cone connector is connected with the first joint and the second joint respectively through plug-in, a sealing ring is disposed between the inner-core cone connector and the first joint and the second joint, the sealing ring is disposed in the annular sealing groove, and a convex spacing ring is further disposed between the tapered protrusion and the annular sealing groove.

5. The four-layer-structured water passing device of claim 4, wherein the first conical sleeve chuck has thereon a protrusion which is matched with the tapered protrusion, and an outer side wall of the first conical sleeve chuck at the end away from the inner-core cone connector is also provided with an annular ridge.

6. The four-layer-structured water passing device of claim 5, wherein both ends of the second conical sleeve chuck are provided with slots, opening directions of the slots are opposite and staggered, and an axial direction of the slots is parallel to the axial direction of the second conical sleeve chuck.

7. The four-layer-structured water passing device of claim 6, wherein the union has an arc-shaped structure which is recessed toward the axial direction thereof, the arc-shaped structure cooperates with the second conical sleeve chuck to clamp the second sleeve and the outer cloth sheath, and the union has an anti-skid pattern on the outer side wall thereof.

8. The four-layer-structured water passing device of claim 7, wherein the first joint and the second joint are provided with one of the following structures at an end away from the union:
- a quick-connect connection structure,
- an internally threaded joint structure, and
- an externally threaded joint structure.

\* \* \* \* \*